June 16, 1964 K. T. KÄLLE 3,137,137
REGULATOR
Filed Sept. 28, 1962
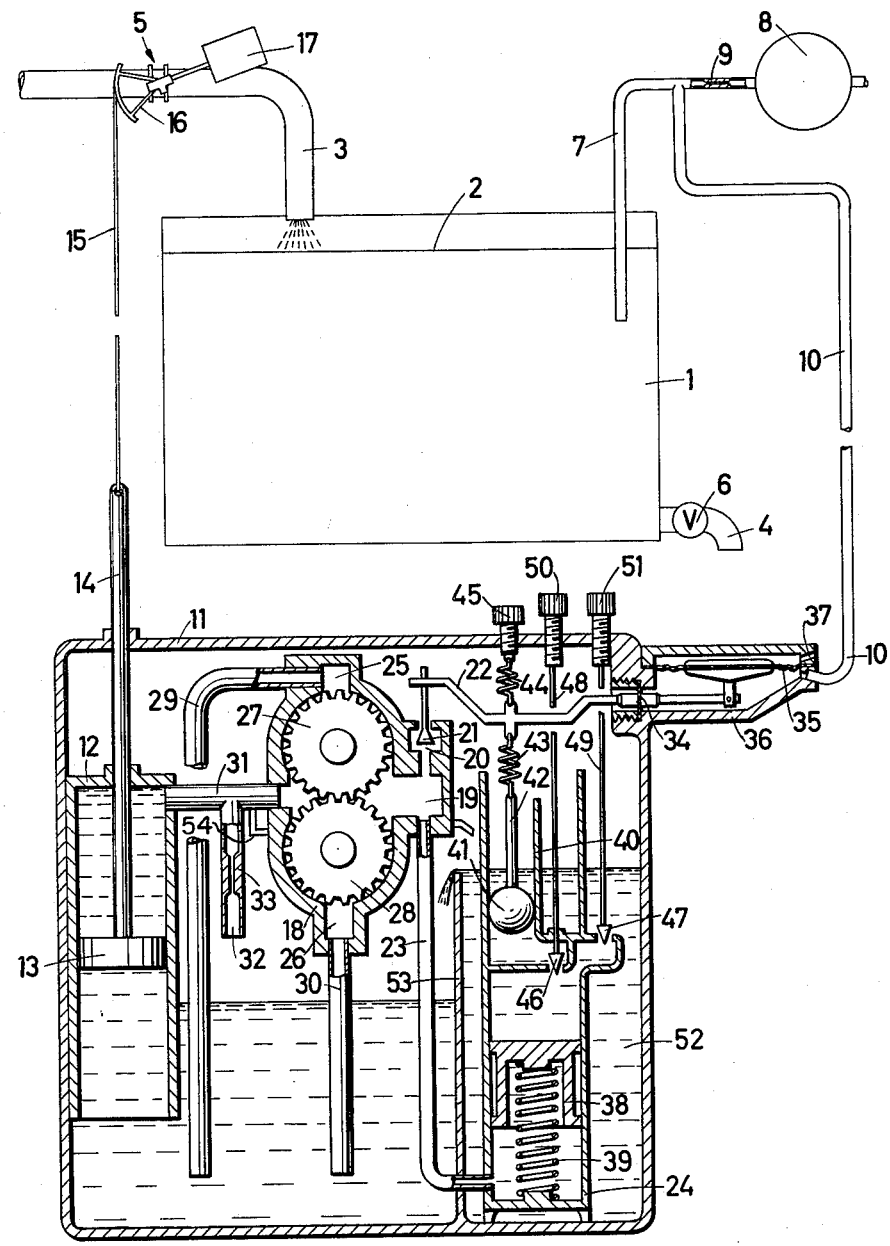

United States Patent Office 3,137,137
Patented June 16, 1964

3,137,137
REGULATOR
Karl Torsten Källe, Sandbacken, Säffle, Sweden
Filed Sept. 28, 1962, Ser. No. 226,886
2 Claims. (Cl. 60—52)

This invention relates to regulators for controlling various physical conditions such as pressures, temperatures, liquid levels etc. The regulator to which the invention especially refers, is of a type which comprises a gear pump, means for supplying a mixture of gas and liquid to the pump, valve means controlling the composition of said mixture, impulse transmitting means influenced by a condition to be regulated and adapted to adjust said valve means in dependence thereof, a passage from the pressure side of the pump to a hydraulic servo motor as well as a restricted outlet for liquid and gas from said pressure side.

The amount of air supplied to the suction side of the pump is generally varied between the value zero (closed valve), when the servo motor performs its optimal regulating work, and a certain maximum value, when the pump sucks and discharges an amount of liquid insufficient for the operation of the servo motor. It has long been desired to achieve a greatest possible range of power for the servo motor by means of reduced amounts of air. The reason for that has been the desire to use light and sensitive air valves requiring small impulse forces only for their adjustment.

The object of the invention is to provide a regulator which may be controlled by comparatively small amounts of air and which may, moreover, be designed to perform also other regulating functions. The regulator is characterized in that the pump has a central inlet for gas and one separate inlet for liquid at the periphery of each gear wheel, each of said liquid inlets being located at an angular distance of at least two gear pitches from the central inlet and at least two gear pitches from the pressure side of the pump. In other words, the two liquid intakes should be disposed such that they are affectively sealed in relation to the central gas inlet as well as to the pressure side, and preferably they are located approximately midway between these two places. On throttling the supply of gas, a corresponding reduction of the pressure arises at the suction side of the pump and the clearings between the gear teeth passing therethrough become filled with gas of that lower pressure. When arriving in front of the liquid intakes, the clearings are then loaded with liquid in proportion to the previous underpressure. In this way, rather small amounts of air will be sufficient for the operation of the regulator within a wide range of forces.

According to a suitable embodiment, the underpressure in the air inlet can be used to advantage to control a return mechanism introducing integrating and derivating functions into the work of the regulator, as will be explained hereinafter.

These and further objects and advantages of the invention will be fully set forth in the following description made in connection with accompanying drawing which shows an embodiment of the regulator. To facilitate the understanding, the regulator is mounted to control the liquid level in a container, though it is evident that this use involves no limitation.

The container and pertaining parts are shown on a substantially smaller scale than the regulator. The container is filled with liquid up to a level 2. The liquid is supplied through a conduit 3 and is discharged through an outlet 4. The supply conduit is provided with a valve 5 adapted to be controlled by the regulator, while a valve 6 in the outlet 4 may be adjusted manually. The level 2 is sensed by means of a dipping bubble tube 7 which is connected to a source 8 of pressure gas over a restricted passage 9. A branch conduit 10 extends from the bubble tube 7 to an impulse transmitting mechanism of the regulator.

The regulator is enclosed in a housing 11 partly filled with oil or another liquid. A servo motor within this housing consists of a vertical cylinder 12 open at its bottom. A piston 13 in the cylinder 12 has a rod 14 extending upwards and projecting through the housing 11. A wire 15 connects the upper end of the piston rod 14 to one end of a lever 16 fixed to the shaft of the valve 5. The opposite end of the lever 16 carries a counterweight 17.

A gear pump 18 mounted in the housing 11 is adapted to be driven at a constant speed by an electric motor, not shown. A chamber 19 provided centrally at the suction side of the pump communicates with a valve housing 20 containing a conical valve member 21 which is linked to an impulse transmitting lever 22 described below. A conduit 23 extends downwards from the chamber 19 to the lower part of a vessel 24, the function of which will also be described later. The pump has two separate intakes 25 and 26 for liquid, each disposed at the periphery of one of the gear wheels 27 and 28, respectively, at an angular distance of about 90° from the chamber 19. Pipes 29 and 30, respectively, extending downwards from the intakes have their lower ends immersed below the liquid level in the housing 11.

The pressure side of the pump 18 is connected to the top of the servo cylinder 12 by means of a conduit 31 from which a branch pipe 32 containing a restricted passage 33 is directed downwardly. Such a device is old in connection with regulators of this type and should not need further explanation.

The lever 22 carrying the valve cone 21 at one end is at a point between its ends fixed to a diaphragm 34 inserted in an opening in the wall of the housing to serve as a link for the lever. The opposite end of the lever is linked to a diaphragm 35 in a diaphragm box 36 mounted on the exterior of the housing. The chambers formed on both sides of the diaphragm 35 are provided with outlets which may be connected to two pressure fluid sources of different pressure. In the embodiment shown, the conduit 10 from the bubble tube 7 is connected to the opening of the lower chamber, while the opening 37 of the upper chamber communicates with the atmosphere.

The vessel 24 connected to the suction chamber 19 of the pump through the conduit 23 has for the greater part the form of an upright cylinder which is disposed vertically below the lever 22. Above the inlet to the conduit 23 the vessel 24 contains a snugly fitting, slidable piston 38 which is secured to the upper end of a helical spring 39, the opposite end of which is secured to the bottom of the vessel.

Another cylindrical vessel 40 of smaller diameter is provided in the upper part of the vessel 24 and contains a ball-shaped piston 41. A rod 42 extending upwards from the piston 41 is suspended in the lever 22 by means of a helical spring 43. The load thus acting on the lever 22 is counteracted by another helical spring 44 which connects the lever with a set screw 45 threaded through the top wall of the housing 11. The piston 41 has been designed as a ball to secure a good seal even if the piston rod should be subjected to some oscillating movement. Of course, it is also possible to use a disk-shaped piston with a spherically rounded circumferential surface.

The bottom of the smaller vessel 40 has an opening throttled by a needle valve 46. Another needle valve 47 throttles a similar opening provided in a bulge of the surrounding vessel 24. The spindles 48 and 49 of the needle valves 46, 47 are fixed to set screws 50 and 51, respectively, threaded through the top wall of the housing 11. Further, it should be mentioned that the vessel 24 is inserted in a separate compartment 52 confined by a partition 53 extending from the bottom of the housing approximately up to half the height of the smaller vessel 40. The liquid level in the compartment 52 must be constant and for this purpose a narrow conduit 54 extending from the pressure side of the pump 18 may be provided to supply liquid to said compartment in such an amount that some excess of liquid always flows over the edge of the partition 53.

The air inlet valve 20, 21 of the pump 18 may, for instance, be dimensioned to admit, when fully open, an amount of air corresponding to half the capacity of the pump. This means that the pressure in the suction chamber 19 can vary from at most half atmospheric pressure down to almost vacuum (when the valve is closed). Consequently, a substantial under-pressure is always prevailing in the chamber 19 and may be utilized for obtaining the regulating functions described below.

In the operation of the regulator described, it is possible to obtain different characteristics of regulation by varying the adjustment of the two needle valves 46, 47. In the following description of different functions it is presumed throughout that the level in the container 1 sinks because of increased discharge of liquid. The pressure in the bubble tube 7 and in the conduit 10 will thereby be reduced, and the diaphragm 35 moves the lever 22 clockwise. The valve cone 21 then throttles the supply of air to the pump 18 which, therefore, sucks in less air and pumps more liquid, whereby the piston 13 of the servo motor moves downwards and opens the valve 5 more so that the level is restored in the container 1.

First, it may be assumed that the valve 46 between the cylinders 24 and 40 is quite open, while the valve 47 is closed. When the supply of air to the pump 18 is throttled, the pressure is reduced in the suction chamber 19 and also in the bottom space of the cylinder 24. The piston 38 is then pulled downwards against the action of the spring 39, whereby the liquid below the piston 41 in the vessel 40 is sucked through the valve 46 into the top of the vessel 24. This causes the piston 41 to move downwards so that the lever 22 is moved anti-clockwise to open the valve 21. Now, a larger amount of air and a somewhat smaller amount of oil is supplied to the servo motor, and therefore its piston 13 moves into a higher position. The function, which is called a "proportionating return," involves that the liquid level in the container 1 will approach its new equilibrium without any risk of oscillation or over-regulation though with a certain delay. However, the proportionating return is not per se of any particular interest in this connection, as it might quite as well be obtained by simpler means, and it has been mentioned here only to give a complete picture of the possibilities of the new return mechanism.

A more effective adjustment of the regulator is obtained, if the valve 47 is opened somewhat, while as before the valve 46 is entirely open. Then, the lowering of the piston 41 will not exactly correspond to the downward movement of the piston 38, as liquid is also sucked through the valve 47. The difference between the piston movements will, of course, increase to the extent that the valve 47 is further opened. The effect will be a modified or "proportionating and integrating return," which means that irrespective of the conditions of operation (increased or reduced discharge from the container 1), a suitable throttling position of the valve 47 results in an almost oscillation-free return to the condition originally adjusted, in the present case a restoration of the original liquid level in container 1.

If both the valves 46 and 47 are throttled, the space above the piston 38 in the cylinder 24 cannot be refilled with liquid quickly enough to permit an unobstructed lowering of the piston 38, when the pressure in the conduit 23 decreases, and the result will be that an effective underpressure is formed in the cylinder space below the piston 38. Thus, the piston 38 will be lowered successively to the extent liquid is sucked in past the valves 46, 47. Also, the downward movement of the piston 41 occurs more slowly than in the cases described above, but owing to the underpressure in the space below the piston 38 the movement will continue over a certain period of time determined by the throttling positions of the valves. The function, which may be characterized as a "proportionating, integrating and derivating return," is of importance particularly in the case of a rather long delay between the starting of the regulating operation and the moment when the result becomes noticeable at the impulse generating place. The function is also of importance when rapid and/or great changes occur in the condition to be regulated. In both cases it is desirable that the regulator quickly starts an effective work of regulation for restoring the predetermined value.

As an example it may be assumed that the liquid level in the container 1 sinks rapidly owing to a sudden and great increase of the discharge. Thus, the regulator must increase the supply of liquid to compensate for the greater discharge as well as to restore the original level, and in this respect the derivating function has a favourable effect. When, as a consequence of the great sinking of the level in the container, the air valve 21 effectively throttles the supply of air to the pump so that the piston 13 is depressed deeply, this great change will have an opportunity to act for some time without being noticeably counteracted by the downward movement of the piston 41. As the liquid level begins to approach the predetermined value, the regulating operation is reduced successively so that said value is reached without over-regulation or oscillation.

In case the piston 13 of the servo motor is instead moved rapidly upwards a great distance, the derivating return described will function correspondingly, in that the piston 38 is successively forced upwards by the higher pressure developed in the space below it.

As a further possibility of adjustment it is to be noted that the valve 46 may be throttled and the valve 47 closed. The effect thereof may be designated as a "proportionating and derivating return," i.e. the integrating function is lacking. The result will be that the value to be controlled varies somewhat at different conditions of operation, but on the other hand the return movement proceeds somewhat quicker.

It may also be mentioned that the spring 43 disposed between the piston rod 42 and the lever 22 has for its primary object to moderate the movement of the air valve 21 so that a "fluttering" is avoided.

It is an essential advantage of the device described that the impulse for actuating the return mechanism can be taken from the suction side of the pump, whereby the desired return movement will start immediately upon a change of the position of the air valve 21. Such a device has been rendered possible because of the effective underpressure obtained in the chamber 19 provided at the suction side of the pump. However, it is also evident that the new pump may to an advantage be used in regulators without such a return mechanism.

What I claim is:

1. A regulator comprising a gear pump, means for supplying a mixture of gas and liquid to the pump, valve means controlling the composition of said mixture, impulse transmitting means influenced by a condition to be regulated and adapted to adjust said valve means in dependence thereon, a passage from the pressure side of the pump to a hydraulic servo motor as well as a restricted outlet for liquid and gas from said pressure side, characterized in that the pump has a central inlet for gas and one separate inlet for liquid at the periphery of each gear wheel, each of said liquid inlets being located at an angular distance of at least two gear pitches from the central inlet and at least two gear pitches from the pressure side of the pump.

2. A regulator according to claim 1, in which a conduit connects the central gas inlet of the pump to a closed chamber having a movable wall portion adapted to be moved in dependence on variations of pressure in said gas inlet, said movable wall being arranged to move a member acting to return the gas inlet valve member.

References Cited in the file of this patent

UNITED STATES PATENTS

| | | |
|---|---|---|
| 2,147,977 | Kalle | Feb. 21, 1939 |
| 2,598,177 | Kalle | May 27, 1952 |